United States Patent
Yokoi et al.

(10) Patent No.: US 7,516,077 B2
(45) Date of Patent: Apr. 7, 2009

(54) VOICE CONTROL SYSTEM

(75) Inventors: Kunio Yokoi, Nagoya (JP); Makoto Tanaka, Anjo (JP)

(73) Assignee: DENSO CORPORATION, Kariya (JP)

( * ) Notice: Subject to any disclaimer, the term of this patent is extended or adjusted under 35 U.S.C. 154(b) by 786 days.

(21) Appl. No.: 10/625,845

(22) Filed: Jul. 24, 2003

(65) Prior Publication Data

US 2004/0172256 A1  Sep. 2, 2004

(30) Foreign Application Priority Data

Jul. 25, 2002  (JP)  ............................. 2002-216070

(51) Int. Cl.
  G06F 17/27  (2006.01)
  G10L 15/00  (2006.01)
  G10L 21/00  (2006.01)
(52) U.S. Cl. ........................... 704/275; 704/9; 704/231
(58) Field of Classification Search .................. 704/275
  See application file for complete search history.

(56) References Cited

U.S. PATENT DOCUMENTS

| | | | | |
|---|---|---|---|---|
| 3,586,261 | A | * | 6/1971 | Paine et al. .................. 244/164 |
| 4,827,520 | A | * | 5/1989 | Zeinstra ........................... 701/1 |
| 5,214,707 | A | * | 5/1993 | Fujimoto et al. ............. 704/275 |
| 5,410,486 | A | * | 4/1995 | Kishi et al. ................... 701/211 |
| 5,754,430 | A | * | 5/1998 | Sawada ....................... 701/209 |
| 5,983,189 | A | * | 11/1999 | Lee .............................. 704/275 |
| 6,230,138 | B1 | * | 5/2001 | Everhart ...................... 704/275 |
| 6,345,254 | B1 | * | 2/2002 | Lewis et al. .................. 704/275 |
| 6,598,020 | B1 | * | 7/2003 | Kleindienst et al. .......... 704/270 |
| 2003/0101060 | A1 | * | 5/2003 | Bickley et al. ............... 704/275 |
| 2004/0030560 | A1 | * | 2/2004 | Takami et al. ................ 704/275 |

FOREIGN PATENT DOCUMENTS

| | | |
|---|---|---|
| JP | A-61-107397 | 5/1986 |
| JP | A-S61-223923 | 10/1986 |
| JP | A-H04-85616 | 3/1992 |
| JP | A-H07-249033 | 9/1995 |
| JP | A-H11-119792 | 4/1999 |
| JP | H11-237895 | 8/1999 |
| JP | A-2000-259172 | 9/2000 |
| JP | A-2000-259180 | 9/2000 |
| JP | A-2001-34289 | 2/2001 |
| JP | 2001-216129 | 8/2001 |
| JP | 2001-255890 | 9/2001 |
| JP | A-2002-205445 | 7/2002 |

OTHER PUBLICATIONS

Machine Translation of JP 11-119792 (submitted by applicant on form 1449), obtained from JPO website.*

* cited by examiner

*Primary Examiner*—David R Hudspeth
*Assistant Examiner*—Justin W Rider
(74) *Attorney, Agent, or Firm*—Posz Law Group, PLC (57) ABSTRACT

A voice control system receives a voice command from a user via a microphone. A command executability determination circuit determined whether the voice command is executable in the current function setting of a target device controlled by the voice control system. If the command is executable, the command is executed. If the command is inexecutable, a proper usage of the voice command and executable commands related to the voice command are provided to the user. Then, the user is prompted to use one of the executable commands. In other words, the user is notified of the reason why the voice command is not executed and a proper usage of the voice command.

19 Claims, 11 Drawing Sheets

VOICE CONTROL SYSTEM

CROSS REFERENCE TO RELATED APPLICATION

This application is based on and incorporates herein by reference Japanese Patent Application No. 2002-216070 filed on Jul. 25, 2002.

FIELD OF THE INVENTION

The present invention relates to a voice control system having a function for providing a proper usage of voice command when an improper voice command is inputted.

BACKGROUND OF THE INVENTION

Figure 11:
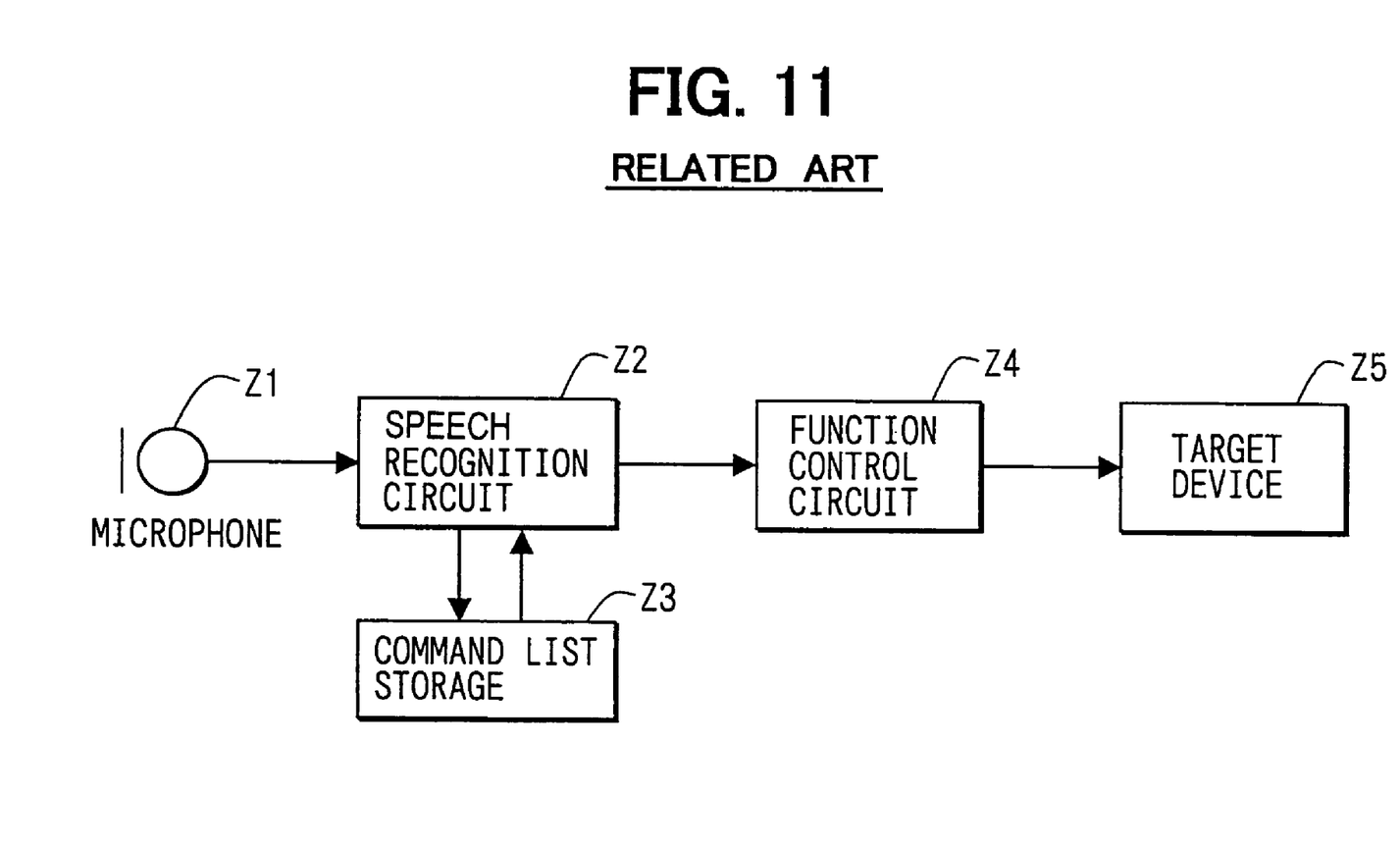
FIG. 11 a block diagram of a voice control system according to a related art.

A voice control system that recognizes a voice command inputted by a user and controls a target device based on the voice command is shown in FIG. 11. The user inputs the command to the system via a microphone Z1. A speech recognition circuit Z2 compares the inputted command with command recognition data stored in command list storage (dictionary) Z3, and selects a command that matches the inputted command. The extracted command is outputted to a function control circuit Z4. The function control circuit Z4 sends a signal to the target device Z5 to perform the function corresponding to the command. The user can operate the target device Z5 with voice commands.

However, the system is not configured to handle a command that is inexecutable in the current settings of the target device. In a case of a vehicle navigation system using the voice control system, the user has to choose a command depending on the current settings of the vehicle navigation system. For example, the user has to select either one of a "set" command for setting a destination for the first time or a "reset" command for canceling a set destination and setting a new destination. If the command that the user has chosen is inexecutable in the current settings, the command will be never executed. Since the user is not notified of the reason why the requested command is not executed, the user may get confused.

This problem may be solved by removing inexecutable commands from dictionary in which recognizable commands are stored according to the current function settings. However, the user is still not notified of the reason. Furthermore, the navigation system may perform a function that the user does not expect when the user has inputted an improper command. Thus, the user may get confused.

SUMMARY OF THE INVENTION

The present invention therefore has an objective to provide a voice control system that has a function for providing a proper usage of a command when an improper voice command is inputted. A voice control system of the present invention includes a recognizable command storing means, a speech recognition means, a message output means, a function setting detection means, and a command executability determination means. The storing means stores recognizable commands as speech recognition data. The speech recognition means recognizes a voice command inputted by a user as one of the recognizable commands by matching between the voice command and the recognizable commands.

The message output means provides proper usages of commands to the user, and the detection means detects a current condition of a target device. The determination means determines whether the recognized command is executable in the current function settings of the target device. The determination means also provides a proper usage of the command to the user when the command is inexecutable.

The voice control system provides a proper usage of a voice command when the command is inexecutable. In other words, the user is notified of the reason why the command is not executed even when the user has inputted an improper command. The system helps the user to operate the target device by providing a proper usage of command and the reason why a requested command is not executed. Therefore, the user can operate the target device without confusion even when the user is not familiar to commands.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings. In the drawings, the same numerals are used for the same components and devices.

First Embodiment

Figure 1:
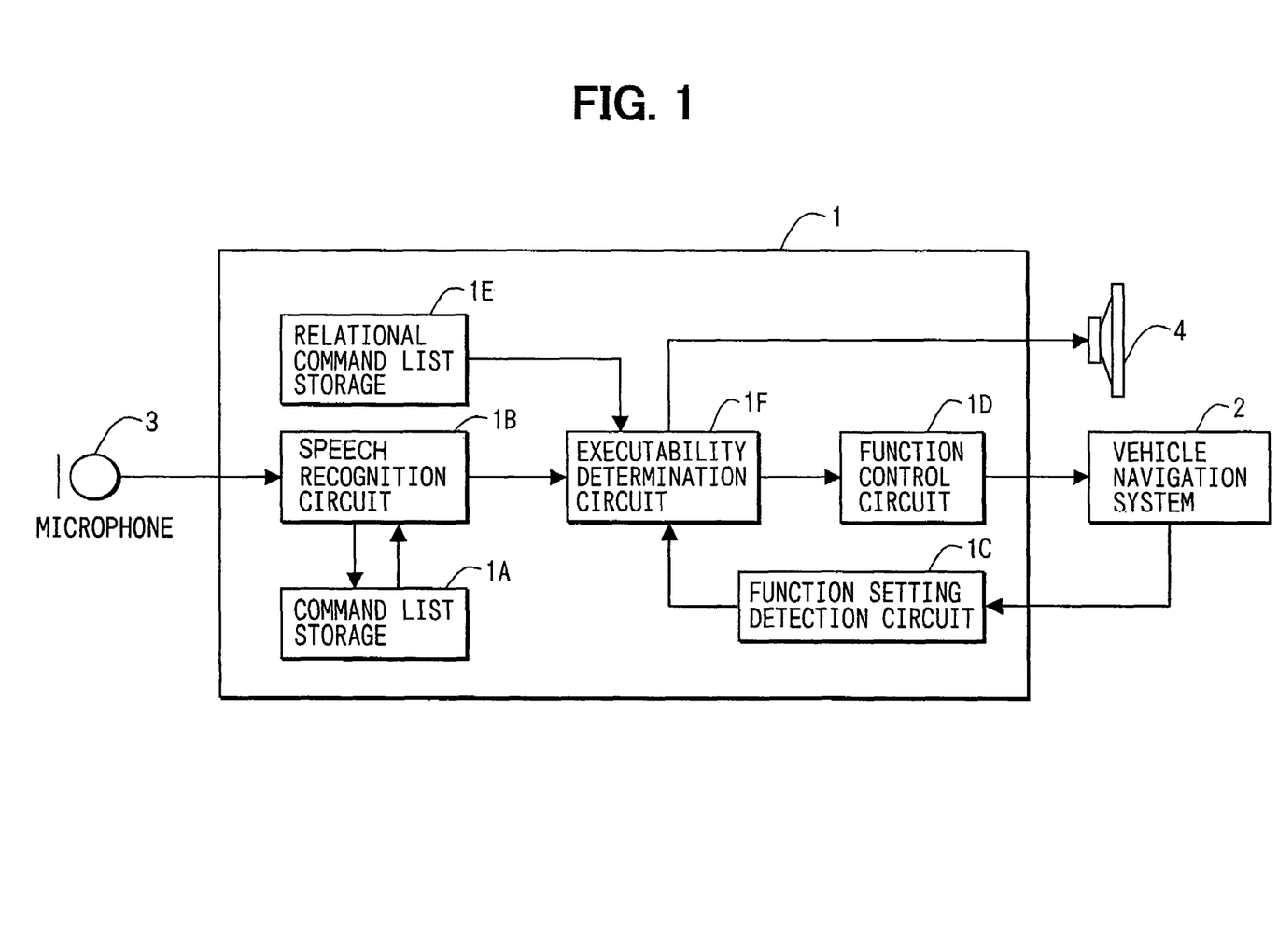
FIG. 1 is a block diagram of a voice control system according to the first embodiment of the present invention.

A voice control system 1 shown in FIG. 1 includes a command list storage 1A, a speech recognition circuit 1B, a function setting detection circuit 1C, a function control circuit 1D, a relational command list storage 1E, and a command executability determination circuit 1F. The command list storage 1A stores voice recognizable command data that is a dictionary of voice control commands for operation of a vehicle navigation system 2.

The speech recognition circuit 1B matches a voice command inputted by a user via a microphone 3 with commands in the dictionary. Then, it selects the command that most closely matches the voice command from the dictionary. The detection circuit 1C connected to the navigation system 2 detects function settings of the system 2 at regular intervals by interrupting the operation. An event-driven determination may be used by outputting a signal from the system 2 every time when any changes are made to the settings.

The function control circuit 1D sends signals to the system 2 for changing the function settings. The relational command list storage 1E creates a list of commands that are commonly confused or commonly misrecognized with a recognizable command for each recognizable command and stores the list.

The determination circuit 1F determines whether the command selected by the recognition circuit 1B is executable in the current function settings. If the command is executable, a signal is sent to the control circuit 1D for sending a signal to the navigation system 2 to execute the command. If the command is inexecutable, a voice message is outputted via a speaker 4, which is a message output device. The voice message provides an indication that the command is inexecutable and a proper usage of the command. The determination circuit 1F refers to the relational command list stored in the storage 1E, and selects a command that is executable and related to the voice command. Then, it provides a voice message of the selected command via the speaker 4.

Figure 2:
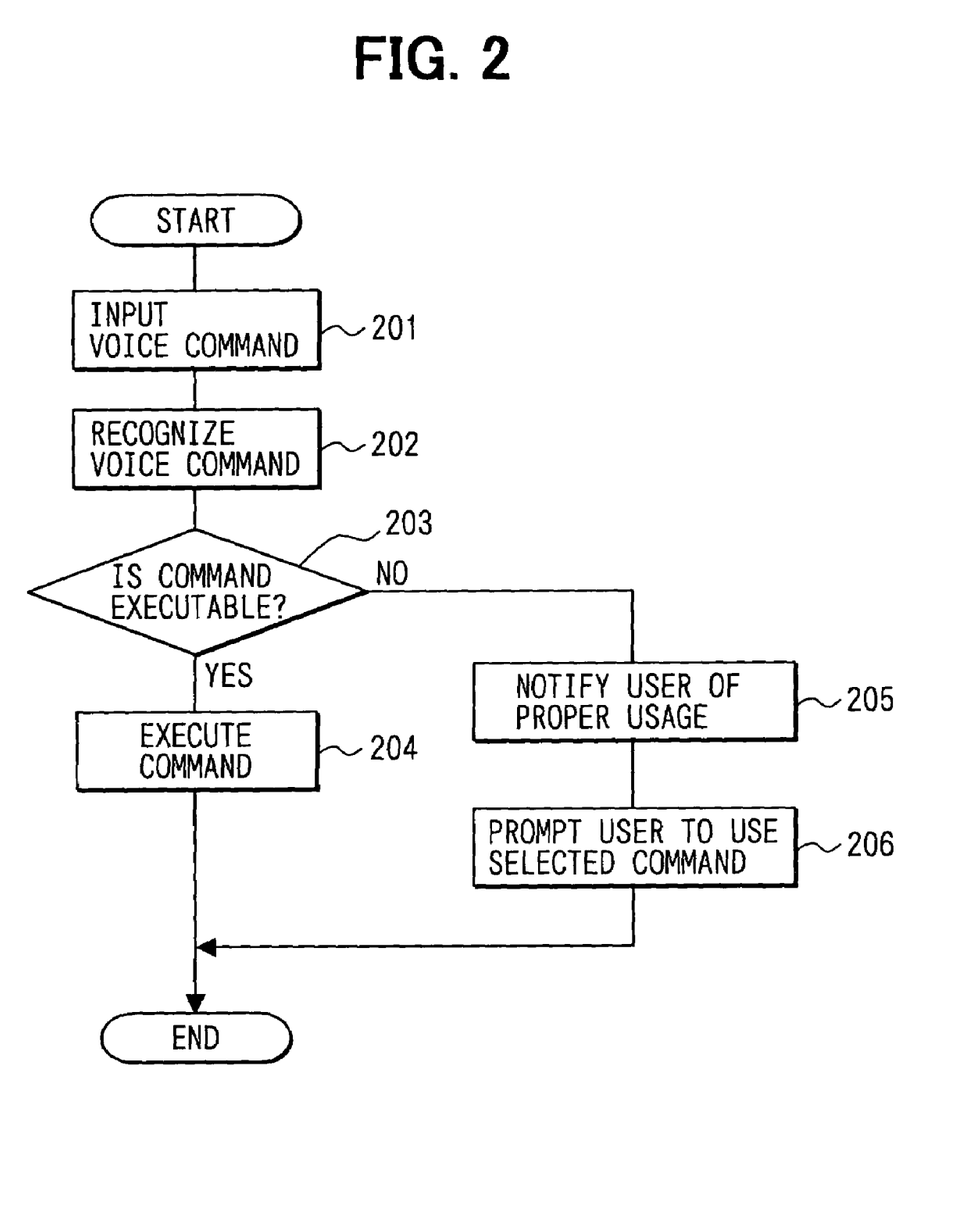
FIG. 2 is a flowchart showing a process for changing function settings of a navigation system according to a voice command inputted by a user according to the first embodiment.

The voice control system 1 changes the function settings of the system 2 according to a voice command inputted by the user following a process shown in FIG. 2. A voice command is inputted from the user to the system 1 via the microphone 3 (S201). The voice command is matched with the commands in the dictionary, and the most closely matched command is selected as a voice command inputted by the user (S202).

It is determined whether the selected command is executable in the current function settings of the navigation system 2 (S203). If the command is executable, the process proceeds to step S204. If the command is inexecutable, the process proceeds to step S205. At step S204, a signal is sent to the navigation system 2 for executing the selected command. The function of the navigation system 2 requested by the user is performed and the process is completed. At step S205, a voice message is outputted via the speaker 4 for providing an indication that the voice command is inexecutable and a proper usage of the command.

At step 6, an executable command related to the voice command is selected from the list and a voice message is outputted via the speaker 4 for prompting the user to use the command. In other words, the user is notified of the reason why the voice command is not executed and the proper usage of the voice command. Thus, the user can learn the proper usage of the command without confusion.

The relational command list includes commands that are commonly confused or commonly misrecognized with recognizable commands. The system 1 helps the user to find the command that the user intends to use by selecting an executable command from the list and provides a voice message of the selected command.

A process performed when an improper voice command is inputted by the user will be explained. A case of setting a destination is taken as an example. A command for setting a destination is either a "set" command or a "reset" command. The set command is used when setting a destination for the first time while the reset command is used when canceling a set destination and setting a new destination. The set command is stored in the relational command list of the reset command and in the confirmation-required command list.

Assuming that the user has inputted the reset command during setting a destination for the first time, the reset command is inexecutable because the destination has not been set. In this case, a voice message of a proper usage of the reset command is outputted via the speaker 4. The voice message says something like, "The reset command is for canceling a set destination and setting the currently displayed point as a new destination," or "You can use the reset command only when a destination has been set." Then, a command related to the reset command is searched. The set command that relates to the reset command is stored in the relational command list. Since the set command is executable, a voice message saying, "Please use the set command," is outputted from the speaker 4. If more than one executable commands are found in the list, a voice message of all commands is outputted followed by another message saying, "Please select from those commands."

Second Embodiment

Figure 3:
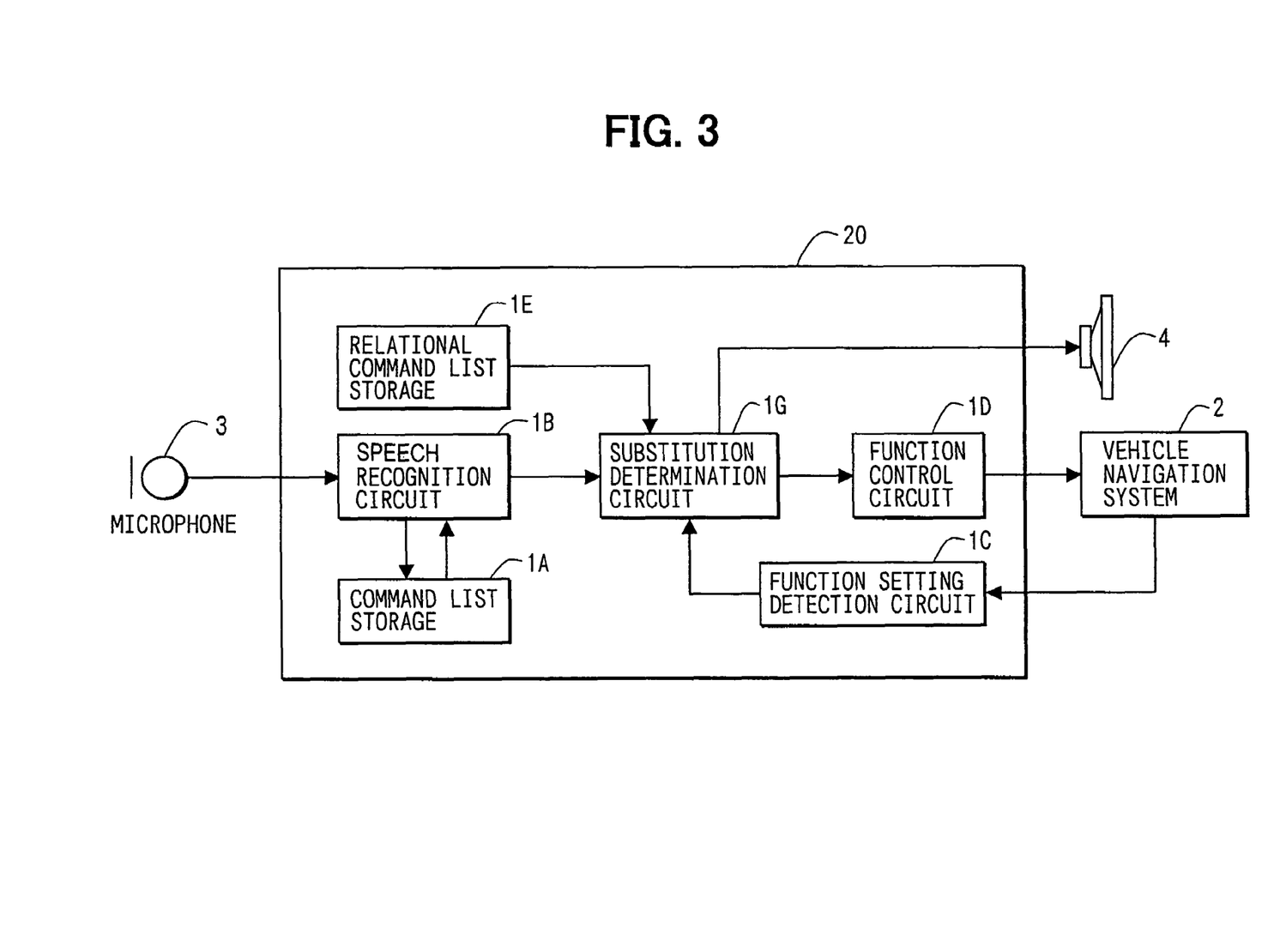
FIG. 3 is a block diagram of a voice control system according to the second embodiment of the present invention.

A voice control device 20 includes a substitution determination circuit 1G instead of the command executability determination circuit 1F as shown in FIG. 3. The circuit 1G determines whether the command selected by the recognition circuit 1B as a voice command of the user is executable in the current function settings detected by the circuit 1C. If the command is executable, the circuit 1G sends a signal to the function control circuit 1D for sending a signal to the navigation system 2 for executing the command. If the command is inexecutable, the determination circuit 1G refers to a relational command list related to the voice command in the relational command list storage 1E. Then, the determination circuit 1G selects an executable command from the list as a substitution and executes the selected command. After the execution of the command, a voice message is outputted for providing name and usage of the command and a proper usage of the voice command.

Figure 4:
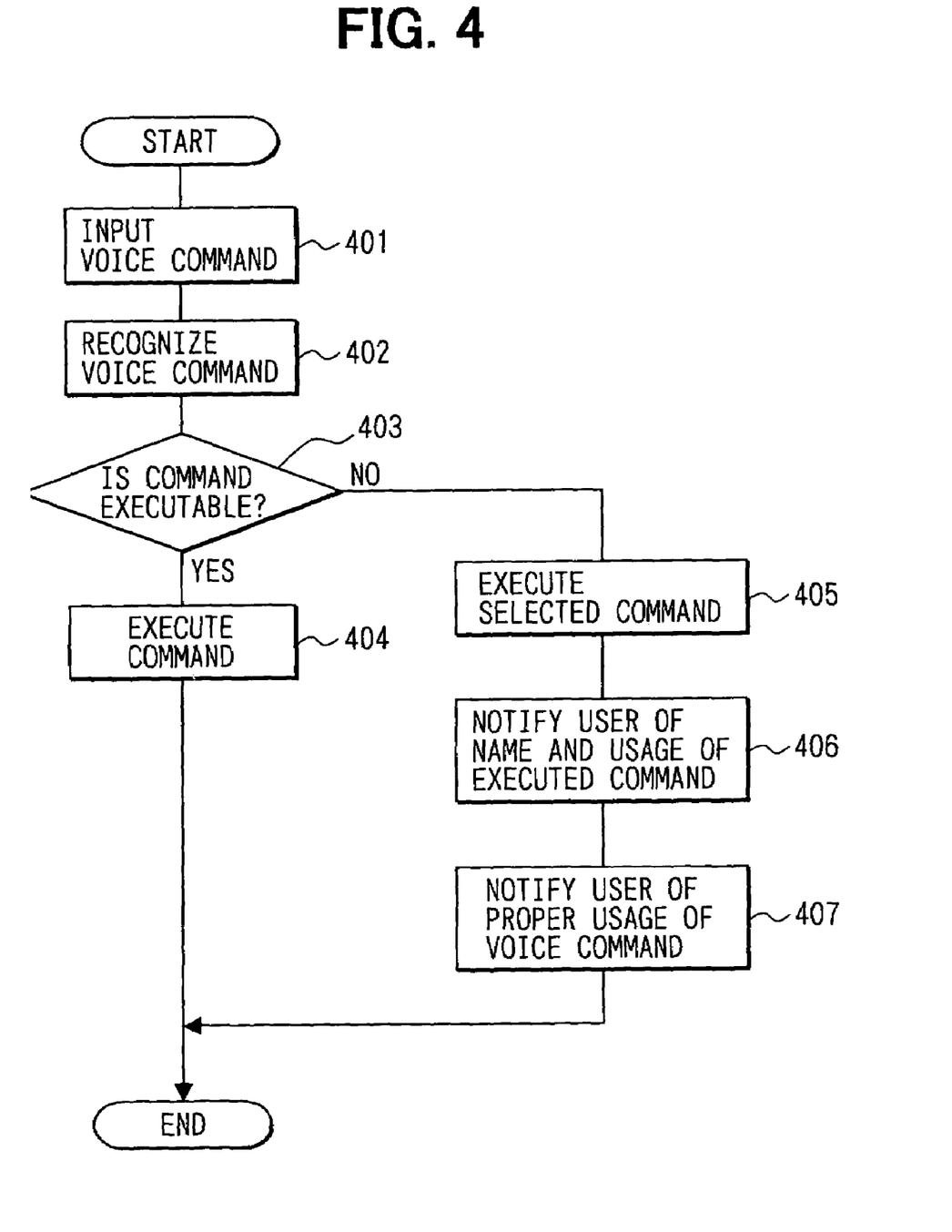
FIG. 4 is a flowchart showing a process for changing function settings of a navigation system according to a voice command inputted by a user according to the second embodiment.

The voice control system 20 changes the function settings of the system 2 according to a voice command of the user as shown in FIG. 4. A voice command is inputted by the user via the microphone 3 (S401). The voice command is matched with the commands in the dictionary stored in the command list storage 1A, and the most closely matched command is selected as a voice command of the user (S402).

It is determined whether the command selected at step S402 is executable in the current function settings of the navigation system 2 (S403). If the command is executable, the process proceeds to step S404. If it is inexecutable, the process proceeds to step S405. At step S404, a signal for executing the command selected at step S402 is sent to the navigation system 2. The function of the navigation system 2 requested by the user is performed and the process is completed.

At step S405, an executable command related to the voice command is selected from the relational command list as a substitution, and executed. A voice message is outputted for providing name and usage of the executed command as well as a proper usage of the voice command. The system 20 helps the user to find the command that the user intends to use by selecting an executable command from the list.

A voice message is outputted via the speaker 4 for providing the name and the usage of the executed command to the user (S406). A voice message providing the proper usage of the voice command is outputted via the speaker 4 (S407). In other words, the user is always notified of the reason why the voice command is inexecutable and the proper usage of the voice command.

A process performed when an improper voice command is inputted by the user will be explained. A case of setting a waypoint en route to the set destination is taken as an example. A command for setting a waypoint is the "add-point" command. The add-point command is stored in the relational command list of the set command as a command related to the set command.

Assuming that the user has inputted the set command during setting a waypoint, the set command cannot be executed because a destination has been set. The add-point command that relates to the set command is selected from the list as an executable command and executed. Then, a voice message is outputted from the speaker 4 for notifying the user of the execution of the add-point command. The voice message says something like, "the add-point command is executed, and the currently displayed point is set as a waypoint." Furthermore, another voice message is outputted for notifying the user of a proper usage of the voice command. The voice message says something like, "You cannot use the set command when a destination has been set."

A function for indicating a distance between the waypoint and the destination may be included as an item for the current function detection, and the reset command may be added in the list. If the waypoint is located between the current position and the destination or closer to the current position, the add-point command is executed, or otherwise the reset command is executed.

Another example is that an improper command is inputted for switching a display to a destination searching mode. A proper command for that is an "address" command or a "facility". A "destination set" command is for setting the currently displayed point as a destination. The address command and the facility command are stored in a relational command list of the destination set command.

If the destination set command is inputted while a menu is displayed, the command cannot be executed when a position to be set as a destination is not displayed. Therefore, the address command or the facility command is selected from the list and the display is switched to the destination searching mode upon the execution of the command. Then, a voice message is outputted via the speaker 4 for notifying the user of switching the display to the searching mode. The voice message is something like, "The display is switching to the searching mode," or "the facility command is executed and the display is switching to the searching mode." Moreover, another voice message is outputted to notify the user of a proper usage of the voice command. The voice message is something like, "You cannot use the destination set command while the menu is displayed."

Third Embodiment

Figure 5:
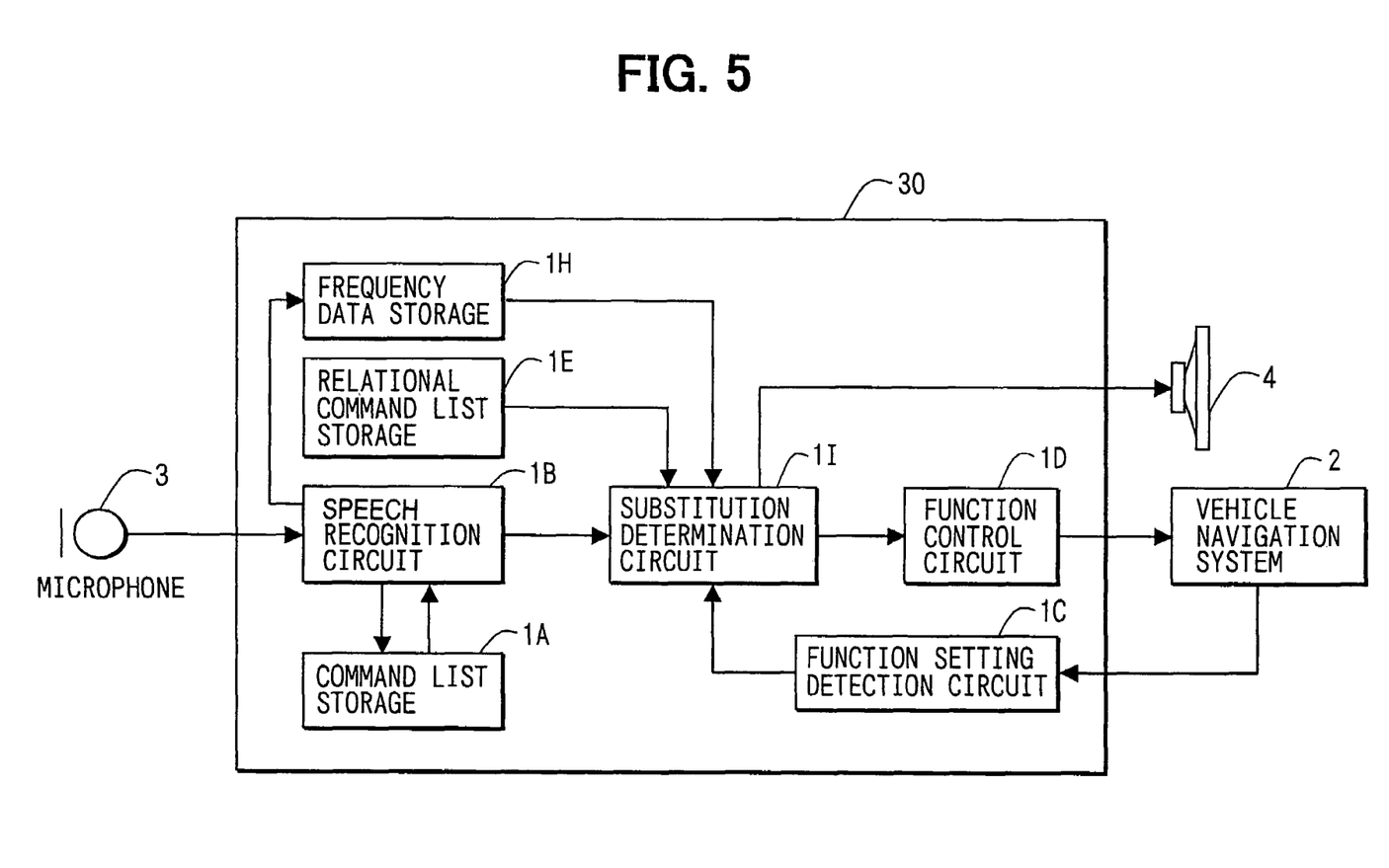
FIG. 5 is a block diagram of a voice control system according to the third embodiment of the present invention.

A voice control device 30 includes a frequency data storage 1H in addition to the circuits included in the device 20 of the second embodiment shown in FIG. 3. Furthermore, a different type of substitution determination circuit 1I from the substitution determination circuit 1G is included. The The frequency data storage 1H stores a frequency in the use of each command included in the voice recognizable dictionary. The frequency is expressed by the total number of times that the command has been used by the user. The number is incremented by one every time when the command is recognized by the speech recognition circuit 1B.

The determination circuit 1I determines whether the command selected by the recognition circuit 1B is executable in the function settings detected by the detection circuit 1C. If the command is executable, a signal is sent to the control circuit 1D for sending a signal to the navigation system 2 to execute the command. If the command is inexecutable, an executable command is selected from the relational command list. If more than one executable commands exist in the list, the frequency stored in the frequency data storage 1H is referred. The command that has the highest frequency is selected and executed as a substitute. A voice message is outputted from the speaker 4 for notifying the user of name and proper usage of the executed command.

Figure 6:
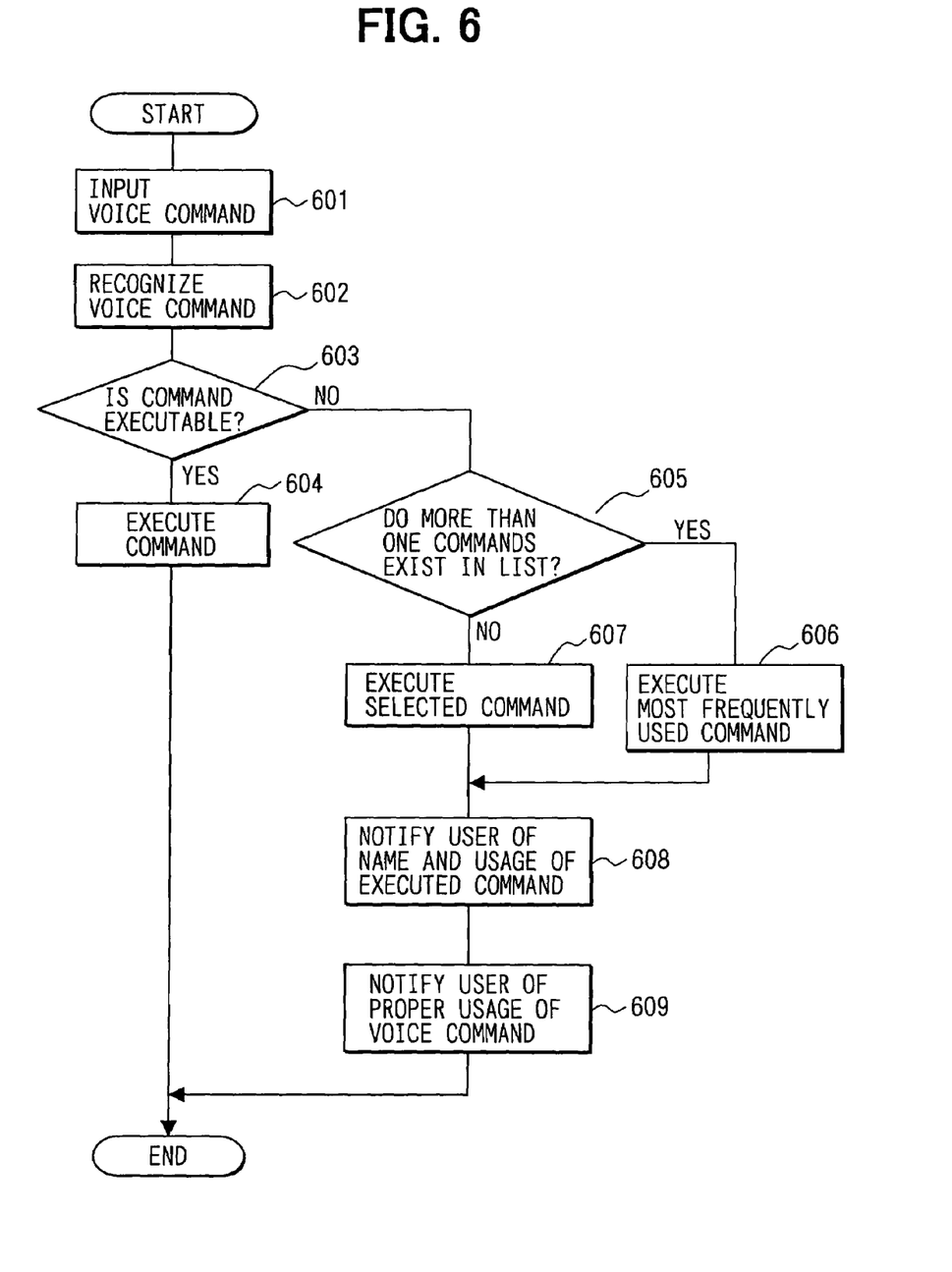
FIG. 6 is a flowchart showing a process for changing function settings of a navigation system according to a voice command inputted by a user according to the third embodiment.

The voice control system 30 changes the function settings of the system 2 according to a voice command inputted by the user as shown in FIG. 6. The voice command is inputted to the system 20 via the microphone 3 (S601). The voice command is matched with the commands in the dictionary, and the most closely matched command is selected as a voice command of the user (S602).

It is determined whether the selected command is executable in the current function settings of the navigation system 2. If the command is executable, the process proceeds to step S604. If the command is inexecutable the process proceeds to step S605. At step S604, a signal is sent to the navigation system 2 for executing the command. The function of the navigation system 2 requested by the user is performed and the process is completed. At step S605, executable commands are searched in the list. If more than one executable commands exist in the list, the process proceeds to step S606. If only one executable command exists in the list, the process proceeds to step S607. If no executable command exists in the list, the process is terminated.

At step S606, the frequency in the use of each executable command is examined, and the most frequently used command is executed as a substitute. Commands often used by the user can be determined based on the frequency stored in the frequency data storage 1H. If more than one executable commands exist in the list, the most frequently used command is selected. By substituting the inexecutable voice command to the most frequently used command, the command that the user intends to use is more likely to be executed.

At step S607, the substituted command is executed. At step S608, a voice message is outputted from the speaker 4 for notifying the user of name and proper usage of the command executed at step S606 or S607. At step 609, another voice message is outputted from the speaker 4 for providing a proper usage of the command selected at step S602.

A process performed when an improper voice command is inputted by the user will be explained. A case of canceling a set destination and setting a new destination is taken as an example. A command for setting a destination is either the "set" command or the "reset" command. The set command is for setting a destination for the first time while the reset command is used for canceling a set destination and setting a new destination.

The reset command and the add-point command are stored in the relational command list of the set command. The add-point command is for setting a waypoint, and therefore, it does not relate to setting a destination. However, the add-point command can be used as an alternative to the reset command depending on the function settings of the navigation system 2. Thus, the add-point command is listed in the relational command list of the set command. The frequencies of the reset command and the add-point command are X and Y, respectively, where X>Y.

Assuming that the user has inputted the set command during resetting a destination, the set command is inexecutable because the destination has been set. The reset command and the add-point command are selected from the relational command list. Since both commands are executable, the frequencies of the commands are examined. The frequency of the reset command (X) is higher than that of the add-point command (Y). Therefore, the reset command having the higher frequency is executed. The rest of the process is performed in the same manner as the second embodiment. Thus, it will not be explained here. By executing a frequently used command, the usability of the system 2 increases even for the user who usually does not set a waypoint.

Fourth Embodiment

Figure 7:
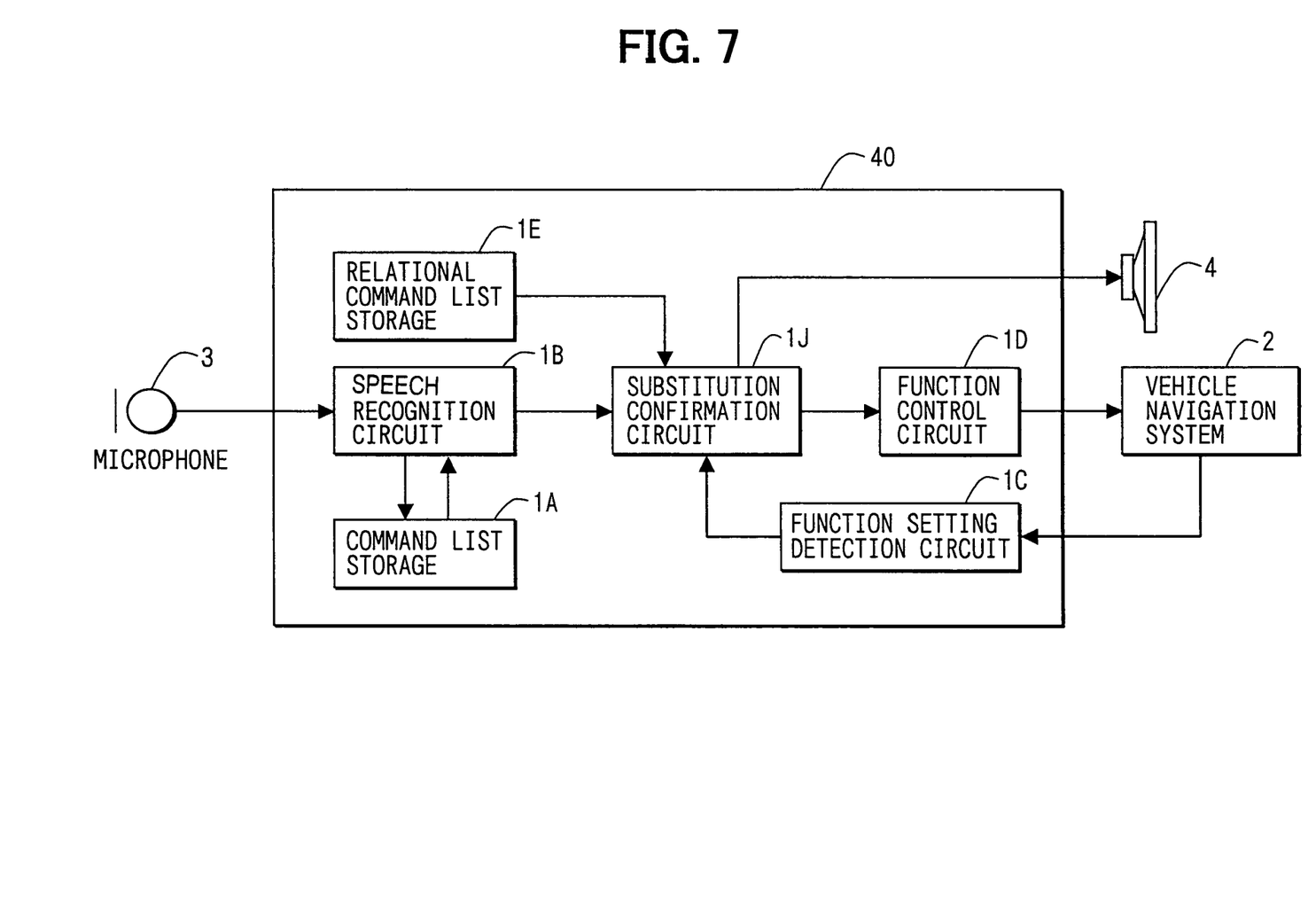
FIG. 7 is a block diagram of a voice control system according to the fourth embodiment of the present invention.

A voice control system 40 shown in FIG. 7 includes a 1J instead of the substitution determination circuit 1G included in the voice control system 10 shown in FIG. 3. The 1J determines whether a command recognized by the circuit 1B as a voice command is executable in the current function settings determined by the detection circuit 1C. If the command is executable, a signal is sent to the circuit 1D for sending a signal to the system 2 to execute the command. If the command is inexecutable, an executable command is selected from a relational command list of the voice command inputted by the user. Then, the user is asked to confirm for execution of the command. If a voice command "YES" or "execute" is inputted by the user, the command is executed.

Figure 8:
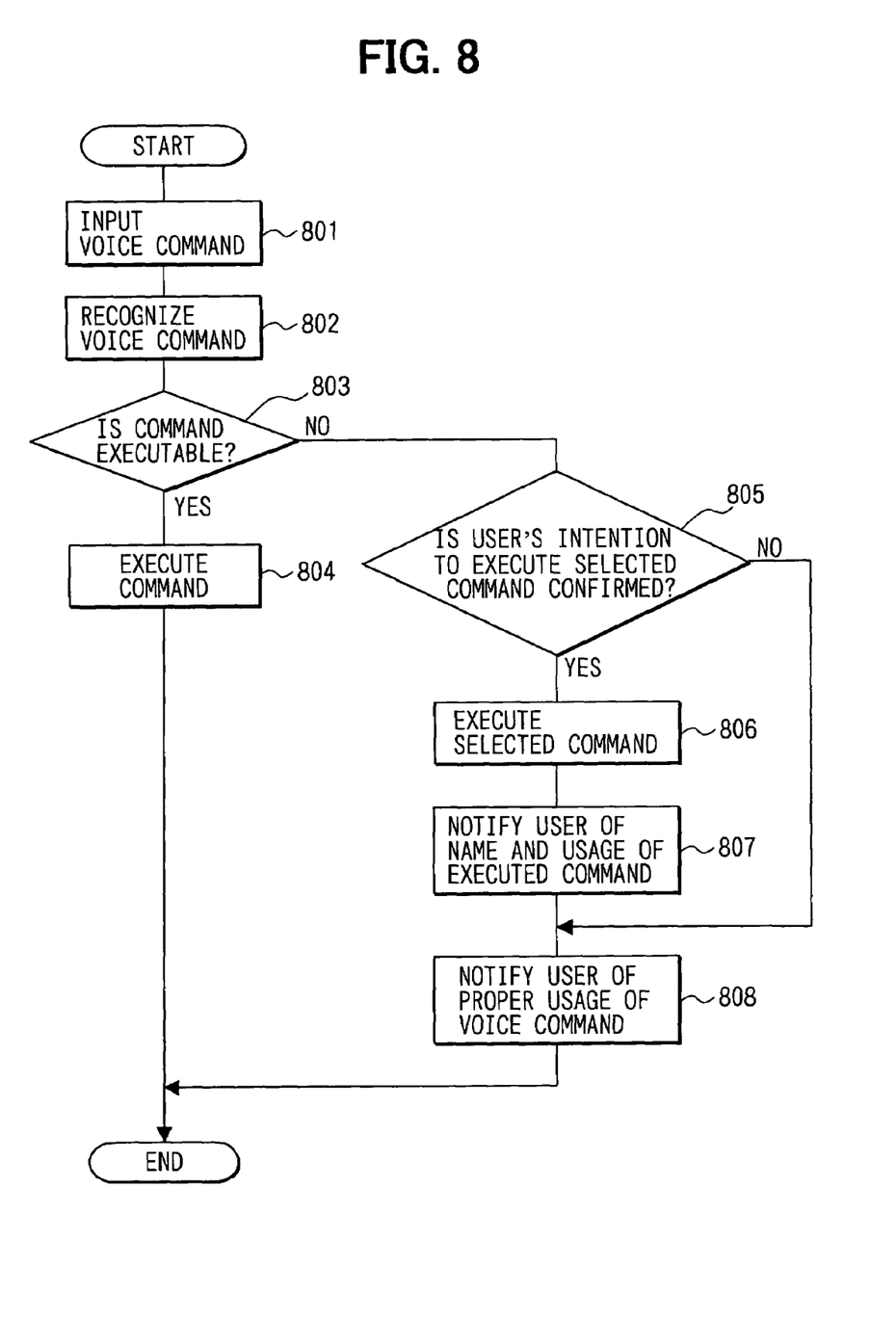
FIG. 8 is a flowchart showing a process for changing function settings of a navigation system according to a voice command inputted by a user according to the fourth embodiment.

The voice control system 1 changes the function settings of the navigation system 2 according to a voice command of the user as shown in FIG. 8. A voice command is inputted to the voice control system 30 by the user via the microphone 3 (S801). The voice command is matched with the commands in the dictionary, and the most closely matched command is selected as a voice command of the user (S802).

It is determined whether the selected command is executable in the current function settings of the navigation system 2 (S803). If the command is executable, the process proceeds to the step S804. If the command is inexecutable, the process proceeds to step S805. At step S804, a signal is sent to the navigation system 2 for executing the command. The function of the navigation system 2 requested by the user is performed and the process is completed.

At step S805, an executable command is selected from a relational command list of the voice command, it is determined whether the user has an intention to execute the selected command. If the command is executed without confirming user's intention, the user may get confused because the command is different from the one that the user intends to use. If the intention of the user is confirmed, the process proceeds to step S806. If the user refuses to execute the command, the process proceeds to the step S808.

At step S806, the command that the user has permitted to execute is substituted with the voice command and executed. At step S807, name and usage of the executed command are announced to the user via the speaker 4. At step S808, a message is outputted from the speaker 4 for providing proper usage of the voice command.

A process performed when an improper voice command is inputted by the user will be explained. A case of setting a waypoint en route to the set destination is taken as an example. A command for setting a waypoint is the add-point command. The add-point command is stores in the relational command list of the set command as a command related to the set command.

Assuming that the user has inputted the set command during setting a waypoint, the set command that the user intends to use is not executed because the destination has been set. The add-point command that relates to the set command is selected from the list as an executable command, and it is determined whether the user has an intention to execute the command. A message is outputted from the speaker 4 for obtaining the intention of the user. The message is something like, "Do you want to execute the add-point command?" If the user says "yes" or "execute" towards the microphone 3, that is, the user inputs a voice command to admit it, the command is executed. The rest of process is performed in the same manner as the second embodiment. Thus, it will not be explained here.

Fifth Embodiment

Figure 9:
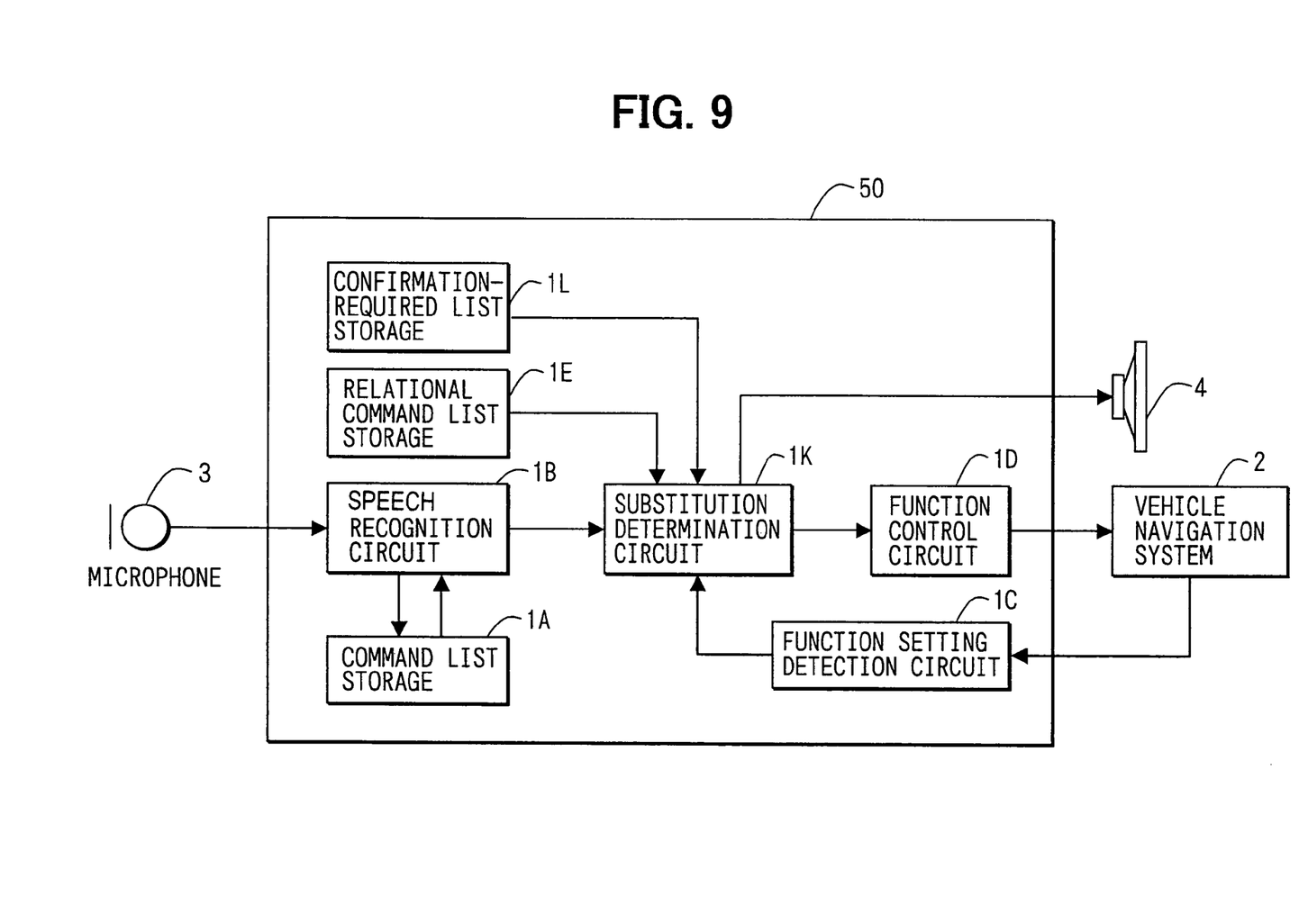
FIG. 9 is a block diagram of a voice control system according to the fifth embodiment of the present invention.

A voice control system 50 shown in FIG. 9 includes a substitution confirmation circuit 1K instead of substitution confirmation circuit 1J, and a confirmation-required command list storage 1L. The confirmation circuit 1K determines whether the command selected by the recognition circuit 1B is executable in the current function settings. If the command is executable, a signal is sent to the function control circuit 1D for sending a signal to the navigation system 2 to execute the command. If the command is inexecutable, an executable command related to the voice command is selected from a relational command list of the voice command.

Furthermore, the confirmation circuit 1K refers to the confirmation-required command list and determines whether the selected command requires confirmation of user's intention for execution. To make confirmation, a message is outputted from the speaker 4. If the user inputs a voice command that indicates the intention, for instance, "yes" or "execute," the command is executed.

The confirmation-required command list storage 1L stores commands that requires the confirmation of user's intention for execution. The stored commands are selected from the commands stored in the command list storage 1A. The commands stored in the storage 1L are difficult to correct once it is executed. Therefore, the user has to pay an extra attention to the execution of the command.

Figure 10:
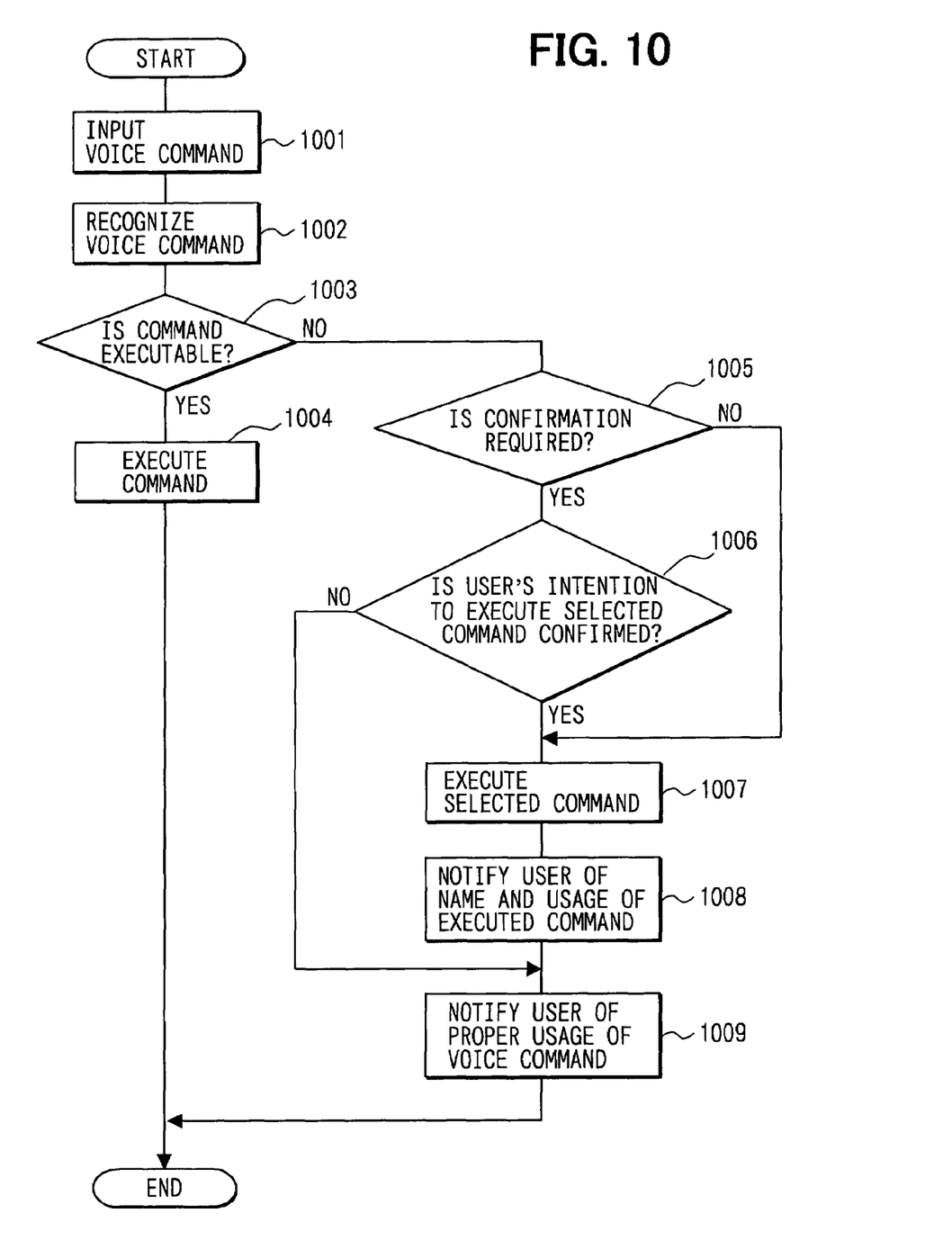
FIG. 10 is a flowchart showing a process for changing function settings of a navigation system according to a voice command inputted by a user according to the fifth embodiment.

The voice control system 50 changes the function settings of the navigation system 2 according to a voice command inputted by the user as shown in FIG. 10. A voice command is inputted to the system 40 via the microphone 3 (S1001). The voice command is matched with the commands in the dictionary, and the most closely matched command is selected as a voice command of the user (S1002).

It is determined whether the selected command is executable in the current function settings of the navigation system 2 (S1003). If the command is executable, the process proceeds to step S1004. If the command is inexecutable, the process proceeds to step S1005. At step S1004, a signal is sent to the navigation system 2 for executing the command. The function of the navigation system 2 requested by the user is performed and the process is completed.

At step S1005, an executable command is selected from a relational command list of the voice command, and it is determined whether the command requires confirmation of user's intention for execution. The determination is made by referring to the confirmation-required command list. The confirmation of user's intention for execution of the selected command is made only if the command is stored in the confirmation-required command list. This reduces the number of times of the confirmation that is performed when a voice command of the user is inexecutable. As a result, the usability of the voice control system 1, that is, the usability of the navigation system 2 improves.

If the selected command requires the confirmation of user's intention, the process proceeds to step S1006. If the selected command does not require the confirmation, the process proceeds to step S1007. At step S1006, the confirmation is made for execution of the command selected from the relational command list at step S1005. If user's intention is confirmed, the process proceeds to step S1007. If user's intention is not confirmed, the process proceeds to step S1009.

At step S1007, the command permitted to execute by the user is executed. At step S1008, a message is outputted from the speaker 4 for notifying the user of name and usage of the executed command. At step S1009, a message is outputted from the speaker 4 for providing a proper usage of the voice command.

A process performed when an improper voice command is inputted by the user will be explained. A case of canceling a set destination and setting a new destination is taken as an example. A command for setting a destination is either the set command or the reset command. The set command is used when setting a destination for the first time while the reset command is used when canceling a set destination and setting a new destination. The reset command is stored in the relational command list of the set command and in the confirmation-required command list.

Assuming that the user has inputted the set command during setting a destination, the set command is inexecutable because the destination has been set. The reset command that relates to the set command is selected from the relational command list as an executable command. Then, it is determined whether the selected command requires confirmation of user's intention. Since the reset command requires the confirmation, a message is outputted from the speaker 4 for making the confirmation. The message is something like, "The current destination will be canceled. Do you want to execute the reset command?" If the user says "yes" or "execute" towards the microphone 3, that is, the user admits it, the command is executed. The rest of process is performed in the same manner as the fourth embodiment. Thus, it will not be explained here.

The present invention should not be limited to the embodiment previously discussed and shown in the figures, but may be implemented in various ways without departing from the spirit of the invention.

What is claimed is:

1. A voice control system for controlling a target device according to a voice command inputted by a user, comprising:
   a recognizable voice command storing means for storing, as speech recognition data, a plurality of commands that are used to operate the target device;
   a speech recognition means for recognizing the voice command inputted by the user as one of the commands stored in the recognizable voice command storing means;
   a message output means for outputting a message;
   a function setting detection means for detecting a function setting of the target device;
   a command executability determination means for determining executability of the voice command inputted by the user in the function setting detected by the function setting detection means and for providing, by the message output means, a correct usage of the voice command inputted by the user in a different function setting, when the voice command is determined inexecutable in the function setting detected currently and is executable in a different function setting of the target device.

2. The voice control system according to claim 1, wherein:
   the command executability determination means includes a relational command list provided to each command;
   the message output means outputs a message for notifying the user of an executable command, executability of which in a current function setting detected by the function setting detection means is determined with reference to the relational command list in addition to outputting a message about a proper usage of the command.

3. The voice control system according to claim 1, further comprising a substitution determination means for substituting the inexecutable command with a command that is executable in the function setting of the target device, wherein
   the message output means outputs a message for notifying the user that the voice command is substituted with the executable command.

4. The voice control system according to claim 3, wherein:
   the substitution determination means comprises a relational command list including related commands listed for each command; and
   the substituted command is selected from the relational command list.

5. The voice control system according to claim 3, wherein:
   the substitution determination means stores a frequency in use of each command expressed by a total number of times that each command has been used by the user; and
   the substituted command is selected based on the frequency.

6. The voice control system according to claim 3, wherein the substitution determination means confirms an intention of the user for execution of the substituted command.

7. The voice control system according to claim 6, wherein:
   the substitution determination means comprises a confirmation-required command list including commands that require confirmation of an intention of the user for execution of a substituted command; and
   the substitution determination means refers to the confirmation-required command list when determining whether the substituted command requires the confirmation.

8. The voice control system according to claim 1, wherein the voice control system is used for a vehicle navigation system having a voice control function.

9. A voice control method for controlling a target device mounted in a vehicle according to a voice command inputted by a user, the method comprising:
   recognizing the voice command inputted by the user as one of predetermined commands to be used in operating the target device, the predetermined commands being stored in a recognizable voice command storage;
   detecting a current operating condition of the target device;
   determining whether the voice command inputted by the user is executable under the detected current operating condition of the target device; and
   notifying a method of correct usage of the voice command inputted by the user in a different operating condition, when the voice command inputted by the user is determined inexecutable under the current detected operating condition but executable to operate the target device under another operating condition of the target device.

10. A voice control method for controlling a navigation device mounted in a vehicle according to a voice command inputted by a user, the method comprising:
    recognizing the voice command inputted by the user as one of predetermined commands to be used in operating the navigation device, the predetermined commands being stored in a recognizable voice command storage;

detecting a current operating condition of the navigation device;

determining whether the voice command inputted by the user is executable under the current detected operating condition of the navigation device;

prohibiting execution of the voice command inputted by the user when the voice command inputted by the user is determined inexecutable under the current detected operating condition; and notifying a method of correct usage of the voice command in a different operating condition of the navigation device, if the voice command is executable to operate the navigation device in the different operating condition of the navigation device, the method of correct usage including the different operating condition.

11. The voice control system according to claim 1, wherein the function setting detection means of the target device detects function settings by interrupting the operation of the target device.

12. The voice control system according to claim 1, wherein the command executability determination means further sends a signal to execute the command when the voice command inputted by the user is determined to be executable under the function setting detected currently, and wherein the function selling of the target device is changed by executing the command.

13. The voice control method according to claim 9, wherein the operating condition is detected by interrupting the operation of the target device.

14. The voice control method according to claim 9, further comprising sending a signal to execute the command when the voice command inputted by the user is determined to be executable under the detected operating condition, and wherein the function selling of the target device is changed by executing the command.

15. The voice control method according to claim 10, wherein the operating condition is detected by interrupting the operation of the navigation device.

16. The voice control method according to claim 10, further comprising sending a signal to execute the command when the voice command inputted by the user is determined to be executable under the detected operating condition, and wherein the function setting of the navigation device is changed by executing the command.

17. The voice control system of claim 1, wherein the target device is a vehicle navigation system, wherein the plurality of commands are further used to change the function setting of the target device.

18. The voice control method of claim 9, wherein the target device is a vehicle navigation system, wherein the predetermined commands are further used to change the operating condition of the target device.

19. The voice control method of claim 10, wherein the predetermined commands are further used to change the operating condition of the navigation device.

* * * * *